United States Patent Office 3,544,494
Patented Dec. 1, 1970

3,544,494
METHOD OF PRODUCING RESINOUS MATERIALS FROM BY-PRODUCTS OBTAINED IN THE REFINING OF PETROLEUM
Detlev Schmidt, Frankfurt am Main, Cacilia Zivi, Hamburg-Wandsbek, Fritz Alberts, Ahrensbok, and Rudolf Radke, Frankfurt am Main, Germany, assignors to Schill & Seilacher Chemische Fabrik, Hamburg, Germany
No Drawing. Filed Apr. 1, 1968, Ser. No. 718,655
Claims priority, application Germany, Mar. 31, 1967, Sch 40,471
Int. Cl. C08c *11/68;* C08d *9/06;* C10c *3/08*
U.S. Cl. 260—17.4                         13 Claims

ABSTRACT OF THE DISCLOSURE

Resinous products suitable as homogenizers for rubber mixtures and/or for other purposes are obtained by treating extracts obtained in the purification of petroleum or asphalt-free residue obtained in the distillation of petroleum at an elevated temperature of up to about 150° C. with a polyol, for instance a sugar, formaldehyde or a formaldehyde derivative, or formic acid, and reacting the thus-obtained pre-treated mixture with nitric acid or nitric acid anhydride at an initial temperature of up to about 120° C. which temperature is then raised to between about 130 and 180° C.

BACKGROUND OF THE INVENTION

The present invention relates to a method of producing resinous materials from by-products obtained in the refining of petroleum, by reacting extracts obtained in the purification of petroleum or substantially asphalt-free distillation residues of petroleum with nitric acid or nitric acid anhydride, i.e. nitrous gases, at elevated temperature, which reacting is preceded by a pre-treatment which will be described in detail further below.

Particularly in the rubber industry a great need exists for effective homogenizers which, for instance, will permit an extending of natural rubber and synthetic polyisoprene-elastomers with other synthetic rubbers, or which will permit the extending of certain types of synthetic rubbers with other synthetic rubbers, or the homogeneous distribution of reinforcing filler materials in stereo-rubbers which are difficult to work up, for instance cis-polybutadiene rubber, and which, in addition, have adhesive and softening properties.

The products which are obtained according to the present invention fill the above-described need.

It has been suggested to obtain acid-free resinous materials from the residue of the petroleum raffination which residue is separated by distillation and consists of the non-drying portion of selected petroleum extracts, which method proposes treatment of the non-drying portion of such selective extracts with nitric acid at elevated temperatures. Nitric acid concentrations up to 98% are proposed for this purpose.

Furthermore, it has been proposed to obtain such resinous bodies by adding 40–60% nitric acid to an extract obtained by selective extraction of high-boiling mineral oil fractions by means of selectively effective solvents, for instance the extract obtained at elevated temperature with furfurol at temperatures which preferably are between about 80 and 120° C., followed by heating of the reaction mixture at temperatures up to 140° C., preferably between about 130 and 140° C. for completing the formation of the resinous bodies.

It is a decided disadvantage of these prior art methods that already upon introduction of diluted acid to the extract which is to be treated certain phenomena occur which interfere with the reaction and which cause reactions which are very difficult to control, even in a temperature range of between about 80 and 100° C. Thus, in pilot plant experiments with 1000 kg. of extract starting material it was not possible to carry out this reaction in a controlled manner.

The cause of the initial impediment to the reaction and the following spontaneous and uncontrollable reaction might be found in the fact that even if the nitric acid which is added is distributed in the extract by expensive stirring the acid will not immediately react with the extract so that initially relatively large amounts of acid accumulate. With increasing amounts or proportions of acid in the extract, suddenly an exothermic reaction will start and immediately escalate to such force or intensity that the reaction can no longer be controlled by cooling so that the batch will boil over under very heavy foam formation and thus will be lost.

The difficulties which are found in laboratory and pilot plant experiments prevent any attempt to treat selective extracts of the type described above with concentrated nitric acid on a large industrial scale.

It is therefore an object of the present invention to overcome the above-discussed difficulties and disadvantages and provide ways and means for carrying out reaction between nitric acid of any desired concentration and extracts obtained in the purification of petroleum as well as asphalt-free petroleum distillation residues on a large industrial scale and within manageable periods of time.

SUMMARY OF THE INVENTION

According to the present invention, the desired resinous products are obtained by treating at least one material selected from the group consisting of (a) extracts obtained in the purification of petroleum and (b) asphalt-free residue obtained in the distillation of petroleum at a first elevated temperature between about 40° C. and 150° C. with at least one substance selected from the groups consisting of polyols such as sugars, aldehydes such as formaldehyde, paraformaldehyde, thioformaldehyde and formic acid, or other hydroxyl groups-containing substances capable of forming nitrous gases with $HNO_3$, contacting the thus-obtained pretreated mixture at a temperature of between about 40 and 120° C. with an oxidizing agent selected from the group consisting of nitric acid and nitrous gases, and heating the thus-formed mixture at a temperature of between about 130 and 180° C.

The term "extracts obtained in the purification of petroleum" is meant—in the context of the present description and claims—to encompass extracts from luboil solvent refining, aromatic petrol extracts, aromatic luboil extracts and the like.

The term "asphalt-free residue" is to denote distillation residues with reduced asphaltene content, up to a maximum of about 6%.

DESCRIPTION OF THE PREFERRED EMBODIMENTS

Surprisingly, it has been found that the difficulties of prior art methods which are sketched out further above will not occur, and an easily controllable, quick and relatively calm reaction of petroleum purification extracts or substantially asphalt-free mineral oil distillation resides can be carried out with nitric acid at elevated temperatures, provided that the petroleum extract or residue which is used as starting material is pre-treated at temperatures between about 40° C. and 150° C. with, for instance, Formalin, formaldehyde or a formaldehyde derivative, such as paraformaldehyde, thioformaldehyde and/or formic acid, polyols such as sugars, for instance saccharose, or pentaerythritol, and the thus-obtained pretreated mixture is then combined with nitric acid or nitric acid anhydride at temperatures of between about 40° C. and 120° C., followed by heating of the nitric acid-containing mixture to a temperature between about 130 and 180° C.

The pre-treating agent or substance preferably is applied in an amount equal to between 0.5 to 15% of the weight of the petroleum extract or residue which is to be treated, and nitric acid or nitrous gases in an amount corresponding to between 5 and 100% of $HNO_3$, again based on the weight of the petroleum starting material.

It is possible, without incurring any dangers, to use in the process of the present invention concentrated or fuming nitric acid. However, it has been found that frequently best results are obtained with nitric acid having a concentration of about 65%.

According to one preferred embodiment of the method of the present invention, the pre-treated material is stirred and during such stirring the nitric acid is introduced.

However, it is also possible to allow the pretreated material to flow under stirring into the nitric acid.

Preferably, the pre-treatment of the starting material is carried out in such a manner that the distillation residue or asphalt-free extract is heated to the required temperature and thereafter paraformaldehyde and/or other pre-treating substances are stirred into the heated starting material.

However, it is also possible to first combine the starting material and the pre-treating substance or substances and thereafter to heat the thus-formed mixture to the required temperature.

Very good results are obtained by using for 100 parts by weight of the extract or distillation residue, i.e. the starting material, up to 65 parts by weight, preferably 30 parts by weight, of 65% nitric acid. If the concentration of the nitric acid differs substantially from 65% acid, then the amount of such nitric acid of other concentration may be substantially correspondingly increased or reduced so as to obtain the equivalent of between about 15 and 65 parts by weight, preferably about 30 parts by weight, of 65% nitric acid for reacting with the pre-treated material.

The proportion of the pre-treating substance relative to the starting material of petroleum origin is of particular importance for the characteristics of the finished product. It is particularly advantageous for obtaining apparently up-to-now novel, highly effective homogenizers for rubber polymers which also have a strong adhesive effect, to carry out the pre-treatment, depending on the reactivity of the petroleum-base starting material with up to 15 parts by weight, preferably between 1 and 9 parts by weight of the pre-treating substance, for instance Formalin, paraformaldehyde, thioformaldehyde, formic acid and/or polyols for each 100 parts by weight of the petroleum-base starting material. Furthermore, it has been found that by the subsequent treating with nitric acid of the reactive products obtained by the pre-treatment of the petroleum-base starting materials with formaldehyde or the like as described above, valuable adhesive products are obtained.

A particularly high yield of resinous products can be obtained if the petroleum-base starting material after the above-described pre-treatment is heated with 30% by weight of 65% nitric acid, thereafter the easily volatilizable constituents of the reaction mixture are distilled off and the thus-obtained product is then subjected again to the entire process of the present invention, i.e. it is used in place of the original petroleum-base material for first being treated with formaldehyde or the like and subsequently with, preferably 15% by weight of 65% nitric acid, in the manner described above.

Finally, it has been found that nitric acid may also be successfully replaced by nitric acid anhydride, i.e. nitrous gases.

The following examples are given as illustrative only without, however, limiting the invention to the specific details of the examples.

EXAMPLE I

An extract obtained by the purification of petroleum (specific gravity 1.06, viscosity at 24° C. 28,000 cp., acid number 0.17) and obtained by selective extraction of petroleum with furfurol, was treated as described in detail below, first with paraformaldehyde and then with 65% nitric acid. The extract serving as starting material had the following composition according to the Rostler analysis (ASTM 2006):

TABLE I

| | Solubility | Composition | Percent by weight |
|---|---|---|---|
| Group: | | | |
| 1 | Insoluble in ligroin | Asphaltenes | 0.3 |
| 2 | Soluble in 85% $H_2SO_4$ | Polar materials | 23.7 |
| 3 | Soluble in 96% $H_2SO_4$ | Unsaturated hydrocarbons | 13.7 |
| 4 | Soluble in fuming $H_2SO_4$ | | 49.6 |
| 5 | Insoluble in fuming $H_2SO_4$ | Saturated hydrocarbons | 12.7 |

500 grams of the above extract were weighed into a glass flask provided with an acid-introducing vessel, exhaust tube, thermometer extending into the sump portion of the vessel and stirrer. In the flask, the extract was heated to 50° C. Thereafter, 30 g. paraformaldehyde were introduced under stirring and the mixture of extract and paraformaldehyde was maintained for one hour at 130° C. Thereafter, the mixture was cooled to about 70° C. and then 150 g. 65% nitric acid was added. The reaction started immediately upon addition of the acid as could be seen by a relatively calm boiling up of the contents of the flask and an increase in the temperature by about 30° C. During introduction of the acid, the flask was maintained, by slight heating, at a reaction temperature of 95° C. After about 150 g. 65% nitric acid had been introduced, whereby no impediment of the reaction was observed, the exhaust tube was closed after a short time cooling of the flask, and the vessel for introduction of acid was replaced by a distilling column with Liebig cooler in order to remove the aqueous phase by distillation. The thus-removed aqueous phase amounted to 91 grams.

Thereafter, the contents of the flask were heated for two hours at a sump temperature of 130° C. There remained in the flask a highly viscous, highly adhesive mass which in the form of a thin layer was of a lacquer-like appearance and overall constituted a resinous mass of reddish-brown color. The yield of this resinous product amounted to 580 grams.

The reaction product obtained in this manner had an acid number of 10.0 and was of the following composition according to the Rostler analysis (ASTM 2006):

TABLE II

| Group:[1] | Percent by wt. |
|---|---|
| 1 | 18.9 |
| 2 | 27.5 |
| 3 | 11.9 |
| 4 | 30.0 |
| 5 | 11.7 |

[1] Solubility and composition of group corresponding to Table I.

Thus, 18.9% by weight of new acetone-soluble resins were formed due to the reaction of the oily groups 3 and 4 with nitric acid.

The thus-obtained resinous product could be excellently worked into mixtures of polybutadiene-natural rubber-carbon black and made it possible to obtain a homogeneous material of these two rubber types and carbon black. In this case, the weight ratio was 70 parts cis-polybutadiene to 30 parts natural rubber and 25 parts, all parts by weight, of the resinous product obtained according to the present invention where used.

The thus-obtained and then vulcanized rubber mixture had excellent fatigue resistance which was tested in stress tests according to the German DIN pre-standard 53522 in a somewhat modified form. An even more severe test was carried out by punching a hole into the notch of the test body, in accordance with DIN pre-standard 53522 (1960), page 3. Even upon 200,000 compression tests no fatigue cracks were formed in the tested body.

By comparison, rubber mixture of normal cis-polybutadiene rubber can withstand at most 20,000 compressions under similar severe test conditions.

These results indicate the excellent homogenization of all constituents of the mixture so that an optimum increase in the vulcanization effect was achieved.

EXAMPLE II

The extract obtained by purification of petroleum as described in Example I and of the composition according to Table I was used again. However, in this case, the extract was pre-treated with an excess of paraformaldehyde and formic acid and, after distilling off of the excess pre-treating substances and substantially equally easily volatilizable constituents, the pre-treated mixture was reacted with 30% by weight of 65% nitric acid. The same apparatus as described in Example I was used. The boiling of the extract with paraformaldehyde and formic acid was carried out under reflux.

Thus, according to the present examples, 200 g. of the extract were mixed under stirring at room temperature with 12 g. paraformaldehyde and 15 g. formic acid and the mixture then boiled for three hours at a reflux. Thereby the temperature in the sump of the flask rose to about 135° C.

After cooling of the flask, the reflux arrangement was replaced by a distillation column with an attached Liebig cooler and the excess of pre-treating substances was distilled off. Thereby, heating was carried out up to a maximum temperature in the sump of the flask equal to about 165° C. The vapor temperature during the distillation remained constant at 102° C., i.e. at the boiling point of formic acid. 16 ml. equal to 18.9 g. of distillate strongly smelling like formaldehyde were obtained in this manner. The paraformaldehyde which precipitated at the walls of the cooler was not quantitatively determined.

There remained in the flask 203.6 g. of thus-pretreated extract. In order to determine whether by such pretreatment the extract had been subjected to changes, a sample thereof was analyzed and found to have an acid number of 2.4, of which water-soluble acid amounted to 1.3 (as against an acid number of 0.17 of the starting extract which also was completely free of water-soluble acid). Furthermore, the content of ligroin-insoluble constituents had risen from an initial amount of 0.3% by weight to 3.3% by weight. The initial viscosity of the extract was greatly increased by the pre-treatment and the reddish color of the initial extract deepened during the pre-treatment.

It can be concluded from these analytical data that the extract was chemically reacted and changed by the pre-treatment and that for this reason the subsequent reaction with nitric acid proceeded in a much calmer manner than would have been the case with an extract which had not been subjected to such pre-treatment.

80 g. of the thus-pre-treated extract were heated to 90° C. and 24 g. of 65% nitric acid were slowly added thereto. During addition of the acid, the temperature of the flask contents was maintained, by slight heating, at between 95 and 100° C. The reaction proceeded smoothly and quietly.

The thus-obtained product, a viscous and highly adhesive resinous mass which in a thin layer was of reddish-brown color and lacquer-like quality was obtained in a yield of 86 grams. It had an acid number of 10.8 and a composition according to Rostler (ASTM 2006) as follows:

TABLE III

| Group: | Percent by wt. |
|---|---|
| 1 | 31.5 |
| 2 | 25.3 |
| 3 | 7.0 |
| 4 | 26.5 |
| 5 | 9.7 |

The thus-obtained product had the same outstanding qualities when used in rubber mixtures as the product obtained according to Example I and particularly by using larger proportions thereof such as between 30 and 40 parts by weight for 100 parts by weight of rubber and in the presence of larger proportions of carbon black reinforcers such as 60–80 parts by weight of carbon black for 100 parts by weight of rubber, excellent results were obtained.

EXAMPLE III

The petroleum purification extract described in Example I was again used as the starting material.

This extract was pre-treated with beet sugar and then reacted with 65% nitric acid. Again an apparatus such as described in Example I was used.

500 g. of extract was heated to 60° C. and thereafter 75 g. of beet sugar was distributed therein under stirring. The extract-sugar mixture was then heated to 80° C. and upon reaching this temperature the addition of nitric acid was begun. During a period of two hours, 150 g. acid was introduced in a continuous manner while a temperature of about 100° C. was maintained by slight heating of the reaction mixture.

Thereafter, the steam exhaust tube was closed and the acid-introducing device replaced by a distillation arrangement and the aqueous phase was removed by distillation. Thereby a maximum temperature in the sump of the flask equal to 130° C. was obtained. 70 g. of aqueous phase was then distilled off. Thereafter, the reaction mixture remaining in the flask was heated for 120 minutes at 130° C.

The thus-obtained reaction product amounted to 650 g., had an acid number of 18.3 (water-soluble acids 2.6) and residual water content of 0.5% and a soft, very adhesive consistency.

Rostler analysis (ASTM 2006) gave the following results:

TABLE IV

| Group: | Percent by wt. |
|---|---|
| 1 | 30.0 |
| 2 | 30.4 |
| 3 | 6.7 |
| 4 | 22.3 |
| 5 | 10.6 |

The amount of bound acid found in the finished product leads to the conclusion that at least part of the sugar had been incorporated into a resin in a chemically changed form.

The thus-obtained product was again excellently suitable as a homogenizer and softener for rubber mixtures.

EXAMPLE IV

An extract was obtained by selective extraction of petroleum with furfurol, which extract contained particularly high proportions of groups 3 and 4 and relatively small proportions of groups 1 and 2, as compared with the extract worked up according to Examples I–III. The petroleum extract used according to the present example had a viscosity of 4.04 at 50° C. and 1.43 E at 100° C., and its Rostler analysis (ASTM 2006) was as follows:

TABLE V

| Group: | Percent by wt. |
|---|---|
| 1 | 0.0 |
| 2 | 5.9 |
| 3 | 19.1 |
| 4 | 60.8 |
| 5 | 14.7 |

Thus, this extract contained only about 6% by weight of polar materials and nearly 85% by weight of reactive oils.

The pre-treatment according to the present invention was carried out with paraformaldehyde in the apparatus described in the preceding examples.

1000 g. of the extract was heated to about 100° C. and thereafter 60 g. paraformaldehyde was admixed under vigorous stirring. Thereafter, the addition of 65% nitric acid was started and a total of 300 g. 65% nitric acid was slowly introduced over a period of two hours. As in the other examples, the reaction started immediately upon initiating the addition of acid as could be recognized by an initially small increase in temperature and the boiling up of the contents of the reaction flask. During the addition of the acid, the temperature of the reaction mixture was maintained by slight heating at about 95° C. The reaction proceeded smoothly and quietly.

Thereafter, the contents of the flask were maintained for 120 minutes at 130° C. and the aqueous phase was distilled off.

There remained in the flask 1080 g. of a resinous product having an acid number of 10. The product was free of water and the various groups or substances according to the Rostler analysis were distributed as follows:

TABLE VI

| Group: | Percent by wt. |
|---|---|
| 1 | 20.7 |
| 2 | 27.4 |
| 3 | 11.3 |
| 4 | 29.0 |
| 5 | 11.6 |

The contents of Table VI clearly show that a resinous mixture had been formed which was not present in the extract serving as starting material.

This example shows clearly the conversion of the hydrocarbon groups 3 and 4 which are ssoluble in 96% sulfuric acid and in fuming sulfuric acid, into polar materials of groups 1 and 2. The polar materials of groups 1 and 2 are substantially soluble in acetone.

The product obtained in this manner was eminently suitable for homogenizing the rubber mixture and, in this respect, gave even better results than the products obtained according to Examples I–III.

EXAMPLE V

According to the present example, the reaction product obtained according to Example I and having an acid number of 10 of which water-soluble acid accounted for 2.9 and containing 25.4 parts by weight of ligroin-insoluble constituents, i.e. acetone-soluble polar resins, was again treated, first by being pre-treated with paraformaldehyde at temperatures up to 140° C. and the thus-obtained pre-treated mixture was then further reacted with 65% nitric acid. The apparatus described in the preceding examples was utilized, however, particularly intensive stirring was carried out.

500 g. of the reaction product obtained according to Example I was heated on a water bath to 65° C., thereafter the stirring device was installed and 30 g. paraformaldehyde was admixed under vigorous stirring. The mixture was then further heated until in the sump of the flask a temperature of 140° C. was obtained. At the beginning of this further heating, at a temperature of about 100° C., a chemical reaction took place and this could be observed by the slight rise in temperature, boiling up and the formation of steam. After five hours reacting at 140° C. and distilling off of the water, a hard and brittle product having an acid number of 14.5 and containing 40% by weight of ligroin-insoluble constituents was obtained.

To the thus-obtained product, 132 g. 65% nitric acid were slowly added under stirring at a temperature of about 100° C. After addition of the acid was completed (after 90 minutes) the reaction mixture was heated for four hours at 140° C. and thereafter the aqueous phase was distilled off and it was noted that the aqueous phase amounted to 17.5 grams.

The product which was thus obtained in a yield of 545 g. was very brittle, had a black shiny surface and was free of water. Like all of the reaction products obtained according to the present invention and in contradistinction to bitumen, it was substantially soluble in acetone. The acid number of the product was 32.3 and the content of ligroin-insoluble constituents which substantially were soluble in acetone amounted to 51.9% by weight.

The present example shows, on the one hand, that pre-treatment of the extract with paraformaldehyde causes chemical reactions which cause an increase in the proportion of ligroin-insolubles without any significant change in the acid number. On the other hand, it shows that by the subsequent nitric acid treatment the content of polar materials, i.e. higher molecular resins and polar lower molecular resins and the acid number increased very strongly although no inorganic acid could be shown.

The advantages of the method of the present invention as compared with the prior art methods described further above may be summarized as follows:

It is possible according to the present invention to achieve a smooth and quick reaction between the starting material, i.e. the pre-treated starting material, and the nitric acid which appears to be free of any danger such as is caused in prior art methods by initial retardation of the reaction and subsequent uncontrolled acceleration or escalation of the reaction rate, and this is so even if highly concentrated or fuming nitric acid is utilized, so that the method of the present invention may be safely carried out on a large industrial scale.

Furthermore, the method of the present invention results in obtaining a product which is particularly valuable as a homogenizing resin which possesses excellent adhesive and softener properties due to a reaction of the pre-treating substances with certain constituents of the petroleum-base starting material which reaction also takes place in the presence of nitric acid. The thus-obtained ligroin-insoluble resins which—and this is essential in accordance with the present invention—in contrast to asphalts and asphaltenes of the bitumens are soluble in acetone, improve the compatibility of the reaction product with rubber polymers in a most advantageous manner, because these resins are soluble in the polymers. These acetone-soluble resins are now made available by the method of the present invention and it is possible thereby to obtain very high yields of resins which according to ASTM 2006 (groups 1 and 2) may consist of up to 70% polar materials.

Without further analysis, the foregoing will so fully reveal the gist of the present invention that others can by applying current knowledge readily adapt it for various applications without omitting features that, from the standpoint of prior art, farily constitute essential characteristics of the generic or specific aspects of this invention and, therefore, such adaptations should are intended to be comprehended within the meaning and range of equivalence of the following claims.

What is claimed as new and desired to be protected by Letters Patent is set forth in the appended claims:

1. A method of obtaining resinous petroleum products, comprising the steps of pretreating at a temperature between about 40 and 150° C. at least one material selected from the group consisting of (a) the non-drying portions of the solvent extracts obtained in the selective extraction of petroleum and (b) substantially asphalt-free distillation residues obtained in the distillation of petroleum and containing a maximum of 6% asphaltenes content with at least one substance capable of forming nitrous gases with $HNO_3$, the said substance being selected from the group consisting of polyols selected from the group consisting of sugars and pentaerythritol, formaldehyde, Formalin, formic acid, paraformaldehyde and thioformaldehyde, then reacting the pretreated mixture at a temperature between about 40° C. and 120° C. with an oxidizing agent selected from the group consisting of nitric acid and nitrous gases; and finally heating the mixture at a temperature between about 130° C. and 180° C.

2. A method as defined in claim 1, wherein said oxidizing agent is selected from the group consisting of concentrated nitric acid and fuming nitric acid.

3. A method as defined in claim 1, wherein said oxidizing agent is introduced into said pre-treated mixture under stirring of the latter.

4. A method as defined in claim 1, wherein said oxidizing agent is nitric acid and said pre-treated mixture is introduced into said nitric acid under stirring.

5. A method as defined in claim 1, wherein said material is heated between said 40 and 150° C. and thereafter said substance is stirred into the thus-heated material.

6. A method as defined in claim 1, wherein said material and said substance are mixed at substantially ambient temperature and the thus-formed mixture is then heated between said 40 and 150° C.

7. A method as defined in claim 1, wherein said oxidizing agent is 65% nitric acid and is utilized in an amount equal to up to 65 parts by weight for each 100 parts of said material.

8. A method as defined in claim 7, wherein the amount of said nitric acid equals about 30 parts by weight for each 100 parts by weight of said material.

9. A method as defined in claim 1, wherein the amount of said substance equals between about 0.5 and 15 parts by weight for each 100 parts by weight of said material.

10. A method as defined in claim 9, wherein the amount of said substance equals between about 1 and 9 parts by weight for each 100 parts by weight of said material.

11. A method as defined in claim 1, wherein said pretreated mixture is heated with about 65% nitric acid in an amount equal to about 30 parts by weight of said nitric acid for each 100 parts by weight of said material; volatile constituents of the thus-formed reaction mixture are distilled off; and the thus-obtained distillation residue is subjected to the method of claim 1, replacing said material therein, whereby said contacting with an oxidizing agent is carried out with about 15 parts by weight of about 65% nitric acid for each 100 parts by weight of said distillation residue serving as said material.

12. A method as defined in claim 1, wherein said oxidizing agent consists of nitrous gases.

13. The product obtained by the method of claim 1.

References Cited

UNITED STATES PATENTS

| 1,868,879 | 7/1932 | Broadhead et al. | 208—44 |
| 2,764,523 | 9/1956 | Cottle et al. | 208—44 |
| 3,152,978 | 10/1964 | Fierce et al. | 208—44 |

FOREIGN PATENTS

| 16,300 | 10/1928 | Australia | 208—45 |
| 714,377 | 8/1954 | Great Britain | 208—44 |

OTHER REFERENCES

Formaldehyde, Walker p. 83, QD305A6W3, (copy in Chem. Library).

WILLIAM H. SHORT, Primary Examiner

E. WOODBERRY, Assistant Examiner

U.S. Cl. X.R.

106—273; 208—44, 45; 260—9, 28, 28.5, 67, 759, 876